United States Patent
Campbell et al.

(10) Patent No.: US 9,021,782 B1
(45) Date of Patent: May 5, 2015

(54) AEROSPACE LASER IGNITION/ABLATION VARIABLE HIGH PRECISION THRUSTER

(75) Inventors: Jonathan W. Campbell, Madison, AL (US); David L. Edwards, Huntsville, AL (US); Jason J. Campbell, Harvest, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 1166 days.

(21) Appl. No.: 12/862,510

(22) Filed: Aug. 24, 2010

(51) Int. Cl.
*F03H 1/00* (2006.01)
*B64G 1/40* (2006.01)
*G21D 5/02* (2006.01)

(52) U.S. Cl.
CPC *B64G 1/406* (2013.01); *F03H 1/00* (2013.01); *G21D 5/02* (2013.01)

(58) Field of Classification Search
CPC ........... B64G 1/406; F03H 1/00; F03H 99/00; G21D 5/02; F02K 9/68
USPC ......... 60/202, 203.1, 253, 255, 204; 244/164, 244/169; 315/111.01, 111.11, 111.21, 315/111.31, 111.41, 111.51, 111.61, 315/111.71, 111.81, 111.91; 102/202, 200, 102/201, 202.5, 328, 329, 330, 440; 89/7; 86/20.12
See application file for complete search history.

(56) References Cited

U.S. PATENT DOCUMENTS

| | | | |
|---|---|---|---|
| 2,114,574 A | | 4/1938 | Rickenbacher |
| 2,836,919 A | | 6/1958 | du Bois |
| 3,625,154 A | * | 12/1971 | Gawlick et al. ............... 102/531 |
| 4,045,269 A | * | 8/1977 | Voss et al. ..................... 156/221 |
| 4,745,859 A | | 5/1988 | Kyoung et al. |
| 4,870,903 A | | 10/1989 | Carel et al. |
| 4,917,014 A | | 4/1990 | Loughry et al. |
| 5,036,767 A | | 8/1991 | Folsom et al. |
| 5,459,548 A | | 10/1995 | Matsuda et al. |
| 6,047,643 A | | 4/2000 | Benner et al. |
| 6,530,212 B1 | * | 3/2003 | Phipps et al. ................ 60/203.1 |
| 2007/0012665 A1 | * | 1/2007 | Nelson et al. ............ 219/121.69 |

* cited by examiner

*Primary Examiner* — Thomas Denion
*Assistant Examiner* — Vikansha Dwivedi
(74) *Attorney, Agent, or Firm* — Absolute Technology Law Group, LLC; James J. McGroary (57) ABSTRACT

A laser ignition/ablation propulsion system that captures the advantages of both liquid and solid propulsion. A reel system is used to move a propellant tape containing a plurality of propellant material targets through an ignition chamber. When a propellant target is in the ignition chamber, a laser beam from a laser positioned above the ignition chamber strikes the propellant target, igniting the propellant material and resulting in a thrust impulse. The propellant tape is advanced, carrying another propellant target into the ignition chamber. The propellant tape and ignition chamber are designed to ensure that each ignition event is isolated from the remaining propellant targets. Thrust and specific impulse may by precisely controlled by varying the synchronized propellant tape/laser speed. The laser ignition/ablation propulsion system may be scaled for use in small and large applications.

27 Claims, 12 Drawing Sheets

AEROSPACE LASER IGNITION/ABLATION VARIABLE HIGH PRECISION THRUSTER

FEDERAL RESEARCH STATEMENT

The invention described herein was made by employees of the United States Government and may be manufactured and used by or for the Government of the United States of America for governmental purposes without the payment of any royalties thereon or therefore.

TECHNICAL DESCRIPTION OF THE INVENTION

The present invention relates generally to the field of rocket propulsion, and more specifically to a device utilizing a pulsed, variable, high precision laser ignition/ablation thruster for propulsion.

BACKGROUND OF THE INVENTION

Aerospace propulsion systems are known in the art. Rockets are propelled using either liquid or solid fuel chemical propulsion or some combination of both. Each system has unique advantages and disadvantages. Liquid fuel chemical propulsion systems can be throttled and are capable of being turned on and off. In addition, the thrust levels can be varied resulting in greater efficiency and flexibility during operation. Liquid propulsion systems, however, generally have a higher mass and require more complex and costly components than do solid rocket systems.

Solid rocket propulsion systems have a lower level of controllability than liquid rocket propulsion systems. Unlike liquid rocket propulsion systems, solid rocket propulsion systems cannot be turned off once lit. Once the propulsion system is turned on, it will continue to burn until all fuel is used up. The inability to be turned off limits the operational envelope and presents a potential safety hazard.

Solid rocket propulsion systems respond more quickly than liquid fuel propulsion systems once turned on. In addition, solid rocket propulsion systems generally have higher performance than liquid fuel propulsion systems, providing a greater thrust/specific impulse per fuel weight. The weight and performance of the fuel is a significant factor for aerospace craft as it is estimated that each additional pound adds $10,000 to the cost of putting a payload into space.

Propulsion systems are usually tailored to meet certain mission requirements and specifications and may have to start and stop a limited number of times. As space applications continue to diversify, scalability in propulsion systems is important and allows rocket builders to more effectively tailor their designs to a given application.

Depending on the mission, liquid propulsion systems also may have inconvenient storage requirements or limited shelf life and may be inconvenient for modular packaging. For example, liquid systems may require the continued cooling for cryogenic fuels with associated insulation and storage tanks while solids would only need a "room temperature" environment.

It is very desirable to have a propulsion system that captures the controllability of liquid propulsion and the high performance of solid propulsion.

It is very desirable to have a propulsion system that is scalable and able to be tailored to a variety of applications, which allows for variable thrust or specific impulse levels.

It is very desirable to have a propulsion system that can be started, stopped and restarted as needed, and which aids in providing high precision performance.

It is very desirable to have a propulsion system with modular design for convenient resupplying, refueling and modifying of ignition/ablation material.

It is further desirable to have a propulsion system that allows multiple systems to be integrated into a single craft.

SUMMARY OF THE INVENTION

The present invention is a pulsed, variable, high precision laser ignition/ablation thruster, which captures the advantages from both liquid and solid propulsion. A reinforced, transparent tape in back carries a volume of propellant or ablation material into the ignition/ablation chamber. A sufficiently intense laser pulse passes through a transparent, high temperature, high pressure laser window and through the transparent carrier tape, striking the back surface of the target propellant/ablation material. If a propellant is used, it is ignited and the expanding gas passing through a rocket nozzle generates thrust. If an ablative material such as paraffin is used, the substance is converted to an expanding gas that passes through a rocket nozzle producing thrust.

Once this event is complete, the tape then moves a new target element into the ignition/ablation chamber and the event is repeated. Many events may take place per second creating high average thrust and specific impulse. Tape speed for a given propellant or ablative substance determines thrust level. This process can be employed on size scales ranging from very small to very large, and may be synchronized with a computer control.

GLOSSARY

As used herein, the term "containment border structure" refers to a component of a transport structure that encloses ignition or ablation material.

As used herein, the term "flammable" means subject to burning when exposed to heat.

As used herein, the term "highly resilient material" refers to a material that is tolerant of high temperatures, pressure, and tension, is able to withstand vacuum environments and environments with an extreme range of temperatures, and which is resistant to tangling. Examples of highly resilient material include, but are not limited to para-aramid synthetic fiber (e.g., Kevlar®) and polyimide (e.g., Kapton®).

As used herein, the term "nonconductive" means not capable of conducting an electrical current.

As used herein, the term "opaque" means a material that absorbs a laser beam rather than allowing it to pass through.

As used herein, the term "propellant material" refers to a substance capable of being ignited or ablated.

As used herein, the term "reel" refers to a rotating component used for storing, dispensing, and/or protecting a transport structure.

As used herein, the term "reinforcing members" refers to material added to a layer of propellant tape to add strength. Reinforcing members may include, but are not limited to wire mesh, metallic wires, wire ribbon, wire threads, Kevlar® threads, and nylon threads.

As used herein, the term "synthetic fiber" refers to a material that is stronger than steel and which is tolerant to high pressure and temperature. Examples of synthetic fibers include, but are not limited to para-aramid fibers (e.g., Kevlar® and Twaron®), polymer fibers, polyethylene fibers, nylon fibers, carbon fibers, and glass fibers.

As used herein, the term "transport structure" or "propellant tape" refers to a component that moves propellant material through an ignition/ablation chamber.

DETAILED DESCRIPTION

For the purpose of promoting an understanding of the present invention, references are made in the text to exemplary embodiments of a laser ignition/ablation propulsion system, only some of which are described herein. It should be understood that no limitations on the scope of the invention are intended by describing these exemplary embodiments. One of ordinary skill in the art will readily appreciate that alternate but functionally equivalent materials, components, and placement may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

Figure 1:
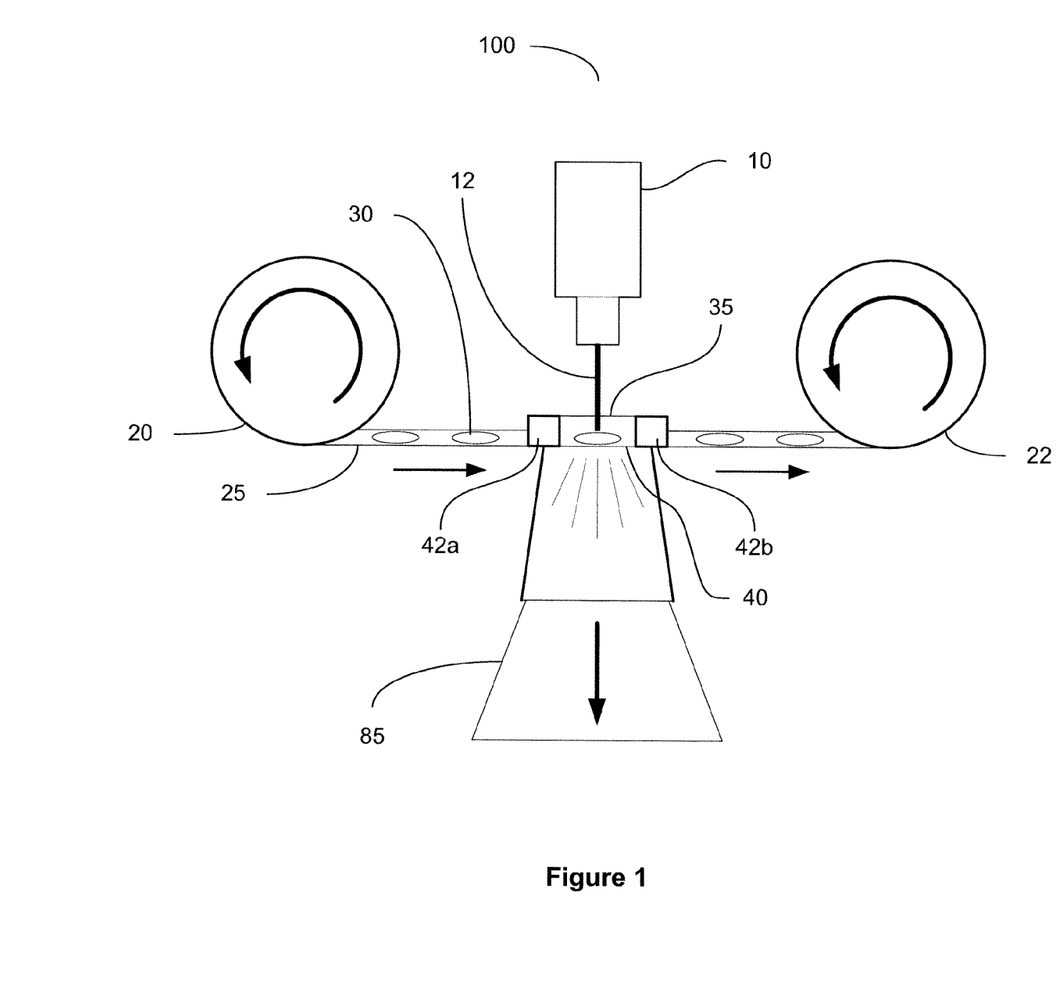
FIG. 1 illustrates an exemplary embodiment of a laser ignition/ablation propulsion system.

FIG. 1 illustrates an exemplary embodiment of laser ignition/ablation propulsion system 100 comprised of laser 10, laser window 35, target containment walls 42a, 42b, ignition chamber 40, storage feed reel 20, storage takeup reel 22, and propellant tape 25. Laser 10 is positioned so that laser pulse 12 passes through laser window 35 between target containment walls 42a, 42b.

Propellant tape 25 contains propellant targets 30 (See FIG. 2a), comprised of ignition/ablation material, at regular intervals. Propellant tape 25 is wound on storage feed reel 20, which unwinds, feeding propellant tape 25 under laser 10. Propellant tape 25 is rewound on storage takeup reel 22 after propellant targets 30 have been ignited/ablated.

When a propellant target 30 is positioned between target containment walls 42a, 42b, propellant tape 25 pauses and laser 10 fires sending laser pulse 12 through laser window 35. Laser pulse 12 strikes the surface of propellant target 30 igniting or ablating it, resulting in a thrust impulse. Propellant tape 25 then carries another propellant target 30 over ignition chamber 40.

The movement of propellant tape 25 is synchronized to the firing of laser 10 so that a new propellant target is in position each time laser 10 fires. The resulting thrust/specific impulse may be precisely controlled by varying the speed of propellant tape 25 and the firing of laser 10.

In addition, the frequency of laser pulse 12 will be a direct function of the burn rate of propellant target 30. The burn of propellant target 30 must be complete prior to moving a new propellant target into ignition chamber 40. The ignition transient time, steady-state burn-time, and tail-off transient for each propellant target 30 needs to be considered. Heat transfer must also be considered.

In the embodiment shown, laser window 35 is integrated with ignition chamber 40, which is comprised of a material that is tolerant of high temperatures and high pressure, and is transparent to the wavelength of laser pulse 12. Laser window 35 prevents the hot gas which results from ignition/ablation from escaping through the top of ignition chamber 40 helping to control the outflow of gas by forcing it to pass through nozzle 85. Laser window 35 may be comprised of a material including, but not limited to polycarbonate resin thermoplastic (e.g., Lexan®), glass, plastic, resin, quartz, silicon, or any other material(s) that is transparent to a laser beam and is tolerant to high temperatures and pressure.

Figure 2A:
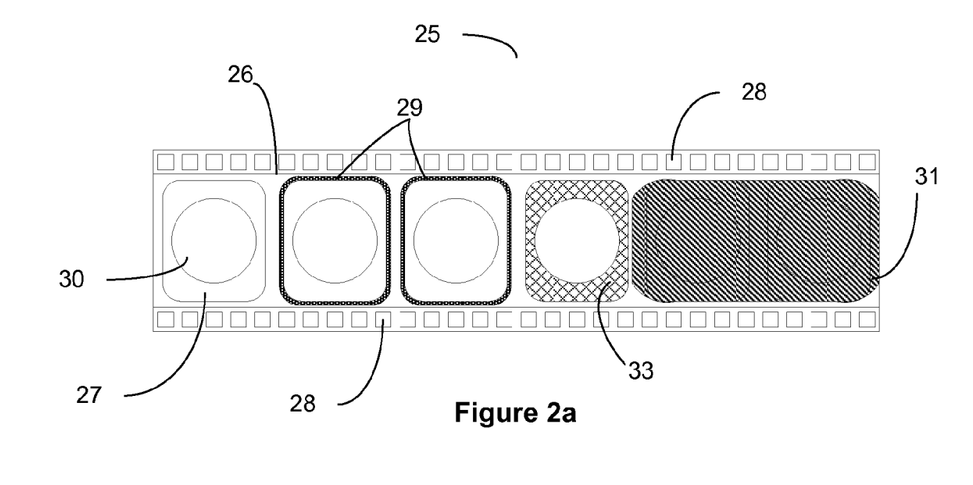
FIG. 2a illustrates a top view of a first exemplary embodiment of propellant tape for a laser ignition/ablation propulsion system.

FIG. 2a illustrates a top view of a first exemplary embodiment of propellant tape 25 for laser ignition/ablation propulsion system 100. Propellant tape 25 is comprised of a plurality of discrete propellant targets 30 positioned at regular intervals between transparent back cover 26 and transport layer 27. Propellant tape 25 is positioned so that transparent back cover 26 faces upward toward laser pulse 12 (see FIG. 2b).

The design of propellant tape 25 is crucial. Propellant tape 25 must protect propellant targets 30 during storage and when a propellant target is ignited/ablated. Propellant tape 25 must prevent the contingency of other propellant targets igniting/ablating in an uncontrolled chain reaction.

In the embodiment shown, transparent back cover 26 is a transparent, heavy duty, relatively thick foundation tape layer that is transparent to the wavelength of laser pulse 12 (not shown). Transparent back cover 26 must be comprised of a material that is robust and thick enough to tolerate the transient temperature and pressure that occurs during ignition/ablation.

Openings are cut in transport layer 27 to the desired size of ignition/ablation material. The openings are then covered with a nonflammable membrane 31, which is secured to transport layer 27. The membrane 31 may be bonded, glued, or sewn to the front of transport layer 27. Containment border structures 29 are mounted to transport layer 27 so that they surround the openings. Ignition/ablation material is then attached to transport layer 27 forming propellant targets 30.

In various embodiments, propellant targets 30 may be comprised of ignition or ablation material. Examples of ignition material include, but are limited to shuttle solid rocket booster propellant, Ammonium Perchlorate Composite Propellant, or another solid rocket propellant known in the art. For lower thrust levels, ablation material, such as paraffin may be used. Propellant targets 30 may be attached to transparent back cover 26 via adhesive properties of the ignition/ablation material or may be glued to transparent back cover 26 using adhesive.

Transport layer 27 is secured to transparent back cover 26 so that propellant targets 30 are secured between transparent back cover 26 and transport layer 27. Transport layer 27 and transparent back cover 26 may be secured together by bonding, gluing, sewing, or another attachment means known in the art to form propellant tape 25.

Transport layer 27 faces toward ignition chamber 40 (not shown). When propellant target 30 is ignited/ablated, propellant target 30 bursts through the membrane 31 into ignition chamber 40.

In the embodiment shown, transparent back cover 26, transport layer 27, and the membrane 31 may be comprised of conductive materials, nonconductive materials, or a combination thereof. For example, transparent back cover 26 and transport layer 27 may be comprised entirely of nonconductive materials including, but not limited to para-aramid synthetic fiber (e.g., Kevlar®) and polyimide (e.g., Kapton®). The use of nonconductive materials prevents an electrical current from traveling through propellant tape 25 causing propellant targets other than the one in the ignition chamber to ignite. In various other embodiments, transparent back cover 26 and/or transport layer 27 may further contain reinforcing members which are nonconductive (e.g., para-aramid synthetic fibers, nylon threads) or nonconductive (e.g., metallic threads). The use of only nonconductive materials may be desirable to maximize safety and reliability; however, metallic reinforcement may be required for maximum performance.

Similarly, the membrane 31 may be comprised of a relatively thin nonconductive material including, but not limited to plastic film, polyimide film, or other plastic film, and/or a conductive material including, but not limited to aluminum foil or another type of metallic foil.

The membrane 31 enhances the storage life of propellant targets 30. In various embodiments, the membrane 31 is comprised of aluminum foil or another type of foil, and/or may be comprised of multiple layers (e.g., a conductive layer and a nonconductive layer). In various embodiments, an additive may be added inside the membrane 31 to further increase the storage capability of propellant targets 30.

Transport layer 27 is the primary drive tape and must be thick enough to allow propellant tape 25 to be driven at a high rate of speed. In addition, transport layer 27 must be impervious to being burned cutting propellant tape 25 in multiple pieces, which would affect the movement of propellant tape 25.

Transparent back cover 26 and transport layer 27 hold propellant targets 30 firmly in position during movement of propellant tape 25 and further enables propellant targets 30 to be accurately aligned between laser widow 35 (not shown) and ignition chamber 40.

In the embodiment shown, propellant tape further includes sprocket holes 28, which correspond to inner gear sprockets 66 of takeup reel 20 (not shown) and aid in the unraveling of propellant tape 25.

In the embodiment shown, propellant targets 30 are circular, but in other embodiments may be of another shape including, but not limited to doughnut-shaped, oval, square, rectangular, star-shaped, or may have an undefined shape or be randomly shaped. In other embodiments, propellant targets 30 have an array pattern so that one element of the array pattern is ignited and subsequently ignites other elements of the array. The cross section of propellant target 30 may also vary. For example, propellant target 30 may be concave or convex in order to optimize performance and cost. In various embodiments, propellant tape 25 may further include optional filler material 33 to smoothen propellant tape 25 so it is better adapted for winding/unwinding on storage feed reel 20 and storage takeup reel 22.

In embodiments where ablation material, rather than ignition material, is used, the ablation material may be located continuously along the propellant tape.

In various embodiments, one or more additional layers of transparent layers with square or circular openings may be joined continuously to the transparent back cover 26 for additional positioning and support of propellant tape 25. In still other embodiments, inserts are attached to transparent back cover 26 and are used to surround propellant targets 30. These inserts may be opaque to the wavelength of laser pulse 12.

In various embodiments, transparent back cover 25 and transport layer 27 materials may vary depending on the ignition/ablation material used for propellant targets 30 and the associated ignition/ablation temperatures and pressures.

The spacing and size of propellant targets 30 on propellant tape 25 is dependent upon a number of factors including, but not limited to the ignition/ablation material being used, the amount of ignition/ablation material in each propellant target, the length of propellant tape 25, the speed that propellant tape 25 moves through the ignition chamber, operation time, and the application for which laser ignition/ablation propulsion system 100 is being used. Propellant targets 30 should be located far enough apart so that one propellant target can be ignited without the risk of igniting adjacent propellant targets. If the propellant targets are located too close together, igniting/ablating one propellant target may cause a second propellant target to ignite/ablate outside of the ignition chamber.

In an exemplary embodiment, propellant targets are uniformly spaced. In embodiments where the desired thrust variations for a mission application are known in advance, non-uniformed spacing of propellant targets may be desired.

Figure 2B:
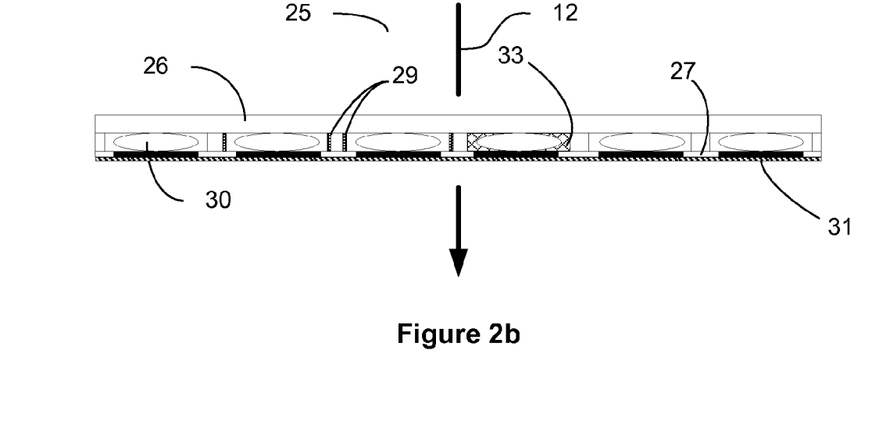
FIG. 2b illustrates a side view of a first exemplary embodiment of propellant tape for a laser ignition/ablation propulsion system.

FIG. 2*b* illustrates a side view of a first exemplary embodiment of propellant tape 25 showing the direction that laser pulse 12 passes through propellant tape 25.

Figure 2C:
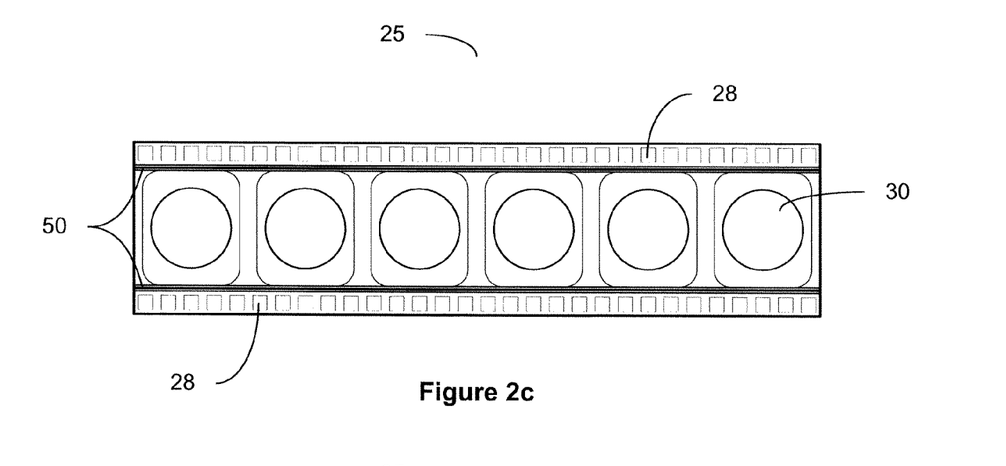
FIG. 2c illustrates a top view of a second exemplary embodiment of propellant tape for a laser ignition/ablation propulsion system.

FIG. 2*c* illustrates a top view of a second exemplary embodiment of propellant tape 25. In the embodiment shown, propellant tape 25 further includes wires 50 between propellant targets 30 and sprocket holes 28. Wires 50 provide additional reinforcement for extremely energetic events and only minimally affect the flexibility of propellant tape 25.

Figure 2D:
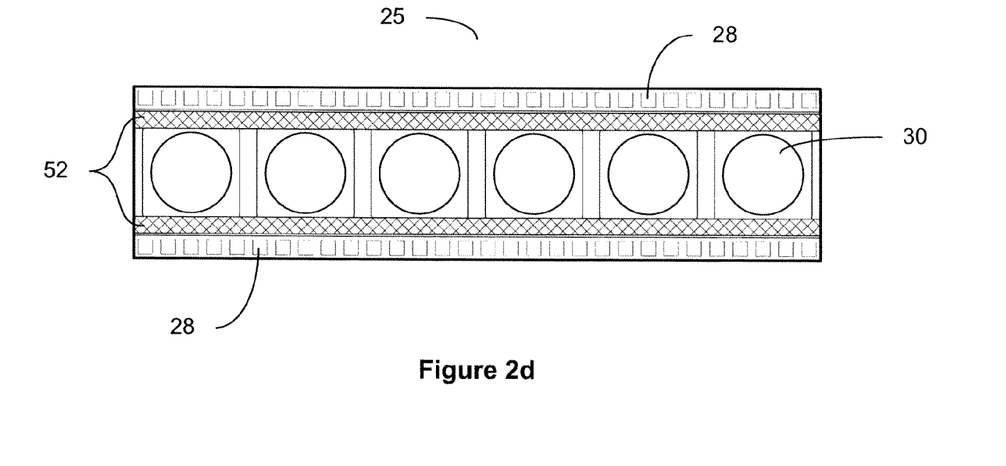
FIG. 2d illustrates a top view of a third exemplary embodiment of propellant tape for a laser ignition/ablation propulsion system.

FIG. 2d illustrates a top view of a third exemplary embodiment of propellant tape 25. In the embodiment shown, propellant tape 25 further includes wire ribbon 52 for additional reinforcement. In various embodiments, propellant tape 25 may be reinforced by embedding steel, para-aramid synthetic fiber, or other high tensile strength wires or threads which run the length of propellant tape 25. A mesh matrix may also be used to reinforce propellant tape 25.

The addition of metallic elements (e.g., threads, wires, wire ribbon) provides a strong border for propellant tape 25 decreasing the likelihood that propellant tape 25 will be cut by ignition/ablation. The width and thickness of propellant tape 25 may also be adjusted to decrease the likelihood of propellant tape 25 being cut.

Figure 3A:
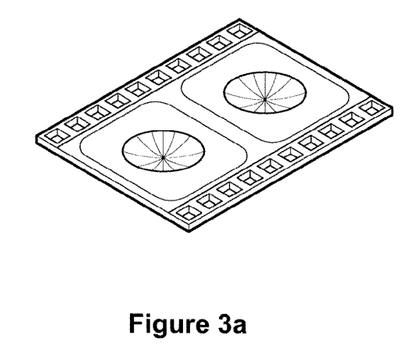
FIGS. 3a through 3d illustrate perspective views of exemplary shapes of propellant targets.
Figure 3B:
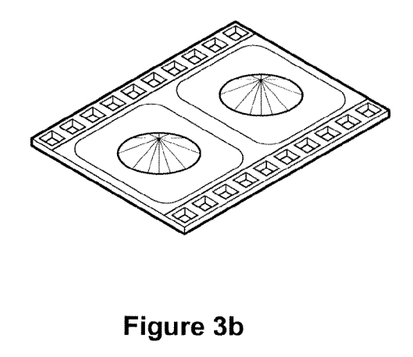
Figure 3C:
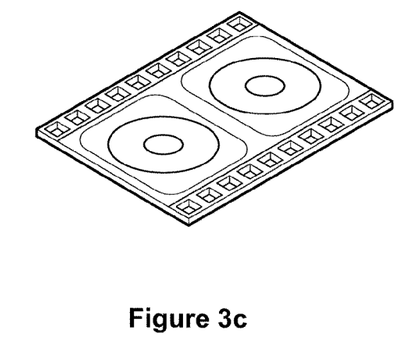
Figure 3D:
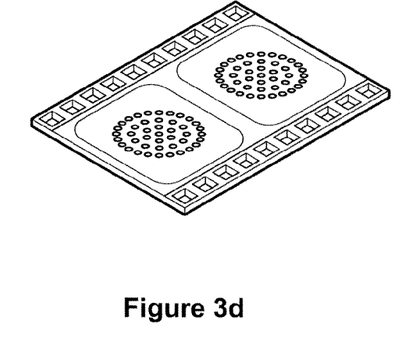

FIGS. 3a through 3d illustrate perspective views of exemplary shapes of propellant targets. FIG. 3a illustrates propellants that are convex, FIG. 3b illustrates propellant targets that are concave, FIG. 3c illustrates donut-shaped propellant targets and FIG. 3d illustrates propellant targets that are arranged in an array. Propellant targets may be shaped and arranged in order to optimize performance and cost for each application.

Figure 4A:
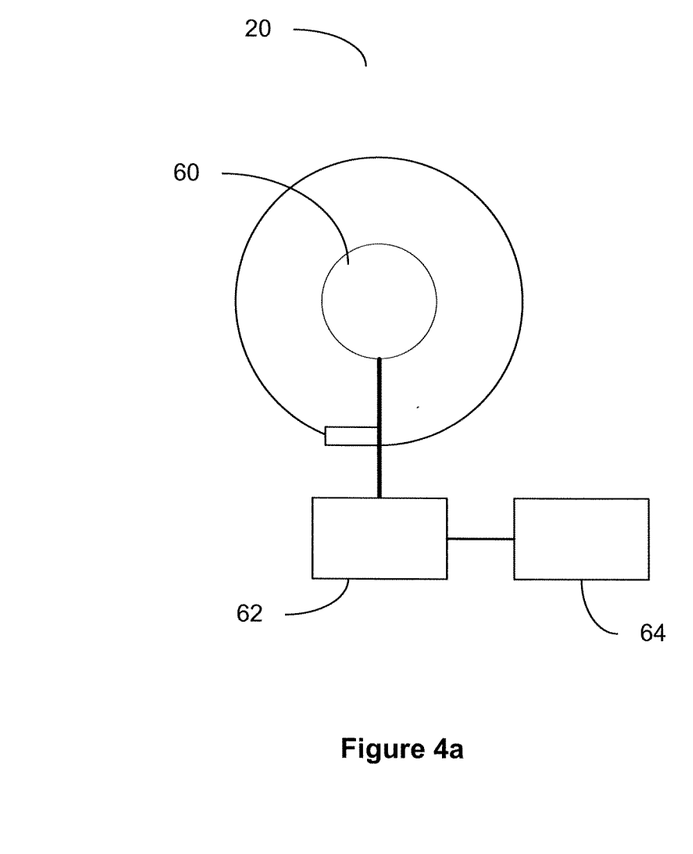
FIG. 4a illustrates a back view of an exemplary embodiment of a propellant tape storage feed reel for a laser ignition/ablation propulsion system.

FIG. 4a illustrates a back view of an exemplary embodiment of propellant tape storage feed reel 20. Propellant tape 25 is wound on storage feed reel 20 and fed into ignition chamber 40 (not shown) and then rewound on storage takeup reel 22 (FIGS. 3a and 3b).

In the embodiment shown, storage feed reel 20 is driven by gearbox 60 and motor 62, which is controlled by controller 64 (e.g., a computer). Controller 64 is isolated outside of the contained area where ignition/ablation occurs. Controller 64 may be hard-wired or wireless and a single controller may be capable of controlling multiple laser ignition/ablation propulsion systems. In an exemplary embodiment, controller 64 controls all aspects of thruster operation and communicates with reel motors and laser 10 (not shown), as well as the spacecraft controller. One controller may operate several reels depending on the mission application.

Figure 4B:
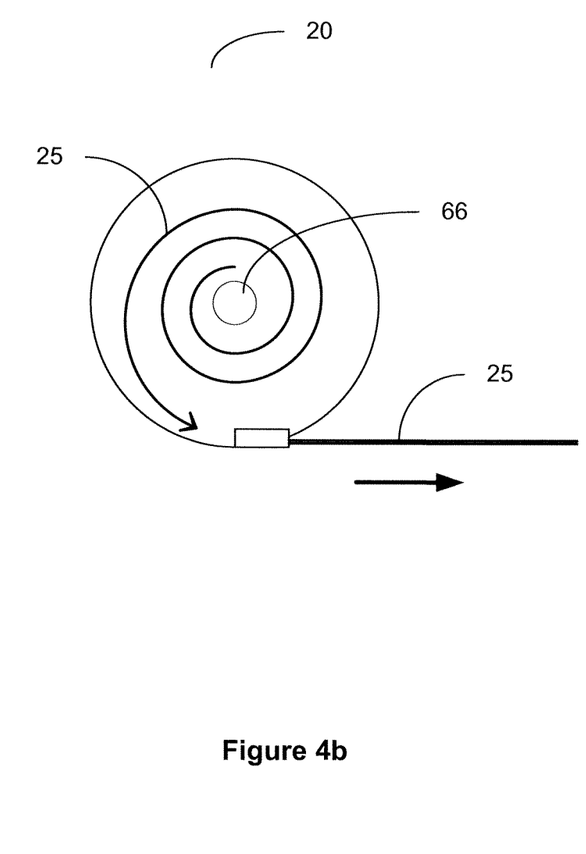
FIG. 4b illustrates a front view of an exemplary embodiment of a propellant tape storage feed reel for a laser ignition/ablation propulsion system.

FIG. 4b illustrates a front view of an exemplary embodiment of propellant tape storage feed reel 20 showing propellant tape 25, the direction of unraveling, and inner gear sprockets 66. Inner gear sprockets 66 correspond to sprocket holes 28 (not shown) in propellant tape 25 aiding in the placement and unraveling of propellant tape 25.

Figure 5A:
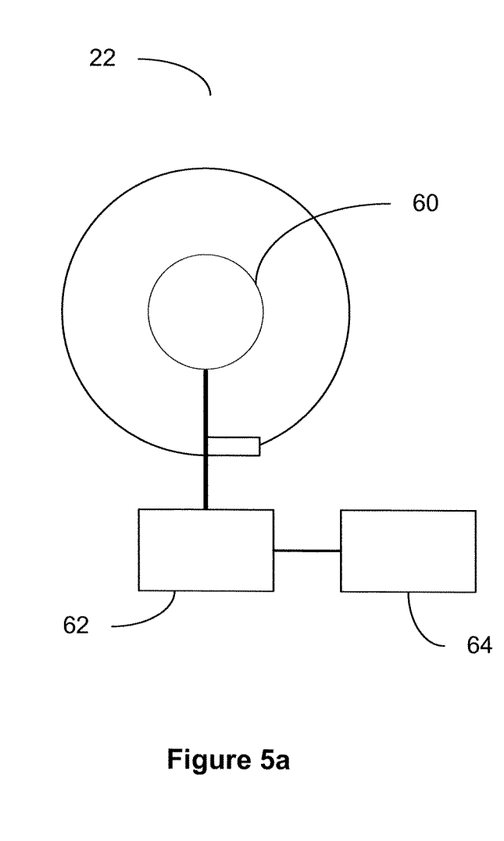
FIG. 5a illustrates a back view of an exemplary embodiment of a propellant tape storage takeup reel for a laser ignition/ablation propulsion system.

FIG. 5a illustrates a back view of an exemplary embodiment of propellant tape storage takeup reel 22. In the embodiment shown, storage takeup reel 22 is driven by gearbox 60 and motor 62, which is controlled by controller 64. In the embodiment shown, controller 64 controls all aspects of thruster operation.

In the embodiment shown, both storage feed reel 20 and storage takeup reel 22 are comprised of light, tough, heat-resistant materials. Storage feed reel 20 and storage takeup reel 22 may be comprised of nonconductive material including, but not limited to high strength plastic such as Kapton®, or carbon composite, and/or a conductive material including, but not limited to aluminum, beryllium, and combinations thereof. In addition, storage feed reel 20 protects propellant tape 25 from outside contamination and humidity.

In various embodiments, one or both reels may be powered. For example, only storage takeup reel 22 is driven by an electric motor and the tension from storage takeup reel 22 is used to unwind propellant tape 25 from storage feed reel 20. In an exemplary embodiment, both storage feed reel 20 and storage takeup reel 22 have gearing which allows them to be driven by a single electric motor. Driving both reels allows for precise control of the tension of propellant tape 25. The controller would sense this level of tension and manage it accordingly to minimize the chance of pulling apart the tape.

Figure 5B:
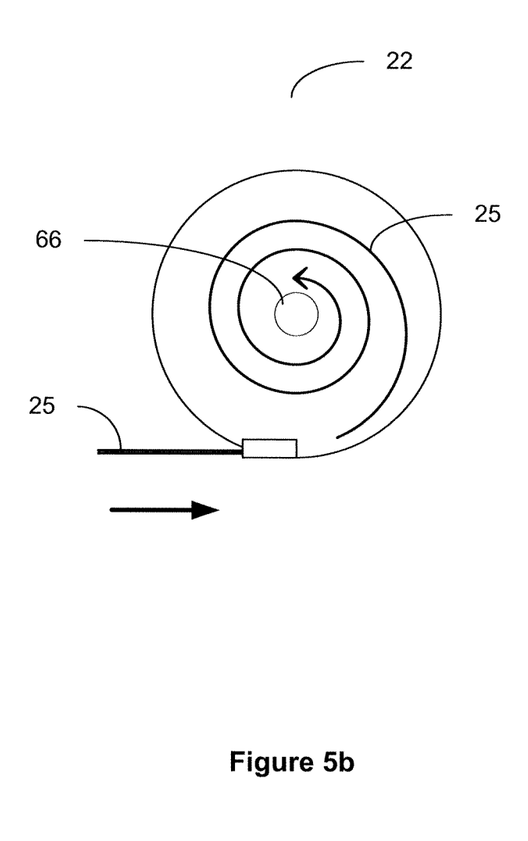
FIG. 5b illustrates a front view of an exemplary embodiment of a propellant tape storage takeup reel for a laser ignition/ablation propulsion system.

FIG. 5b illustrates a front view of an exemplary embodiment of propellant tape storage takeup reel 22 showing propellant tape 25 and inner gear sprockets 66 which correspond to sprocket holes 28 (not shown) on propellant tape 25.

Figure 6:
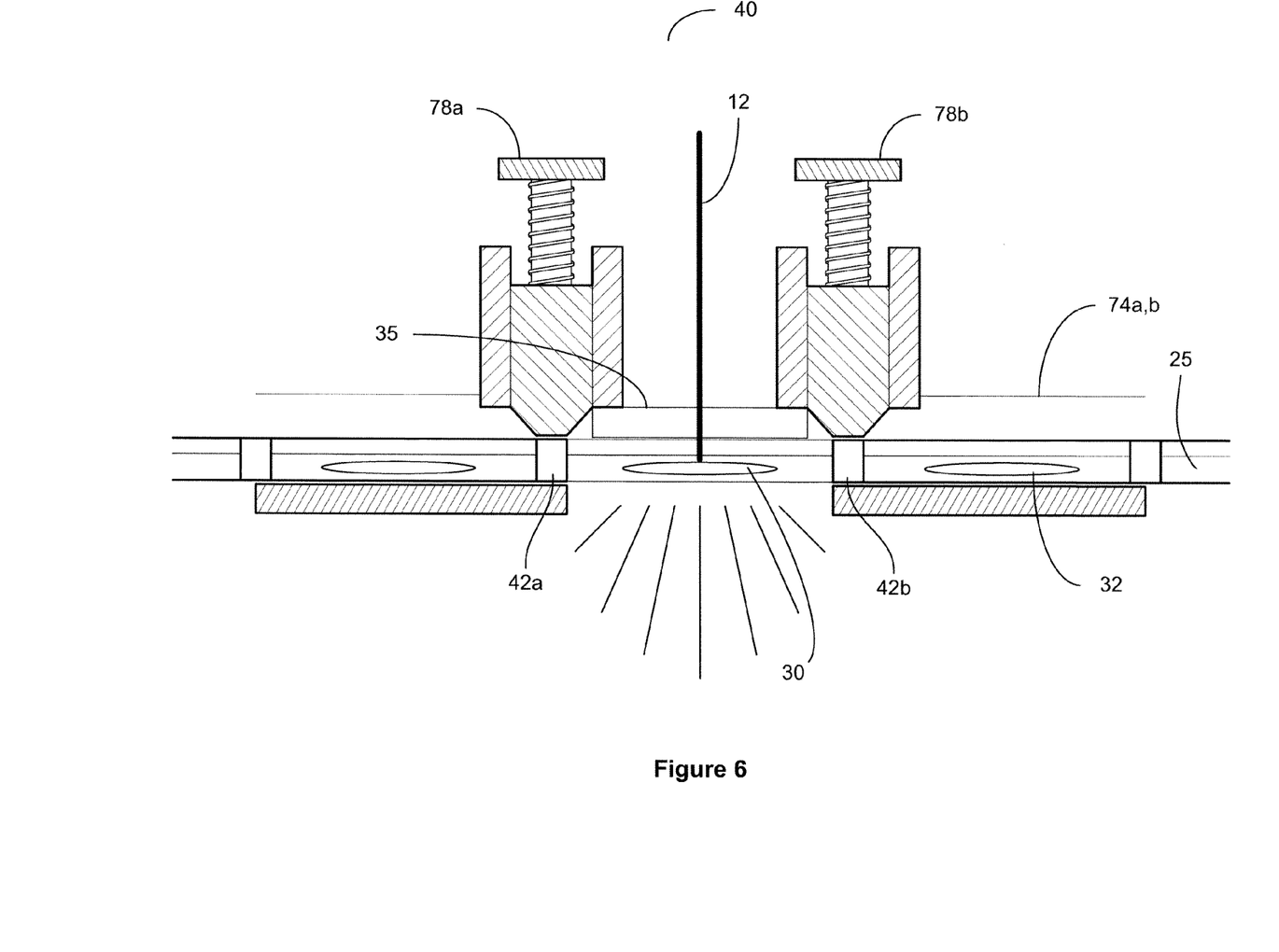
FIG. 6 illustrates a cross sectional view of an exemplary embodiment of an ignition/ablation chamber for a laser ignition/ablation propulsion system.

FIG. 6 illustrates a cross sectional of an exemplary embodiment of ignition chamber 40 showing laser window 35, target containment walls 42a, 42b, tape containment walls 74a, 74b, synchronizing mechanism 78a, 78b, propellant tape 25, propellant target 30, expended propellant target 32, and laser pulse 12.

Target containment walls 42a, 42b and tape containment walls 74a, 74b isolate the ignition/ablation event from the rest of propellant tape 25, from other propellant targets 30, and from storage feed reel 20 and storage takeup reel 22. Target containment walls 42a, 42b seal off the ignition chamber 40 during an ignition/ablation event. During the ignition/ablation event, the only escape path for expanding gases is through nozzle 85 (not shown).

Synchronizing mechanisms 78a, 78b are movable and are used to place additional pressure on propellant tape 25. Synchronizing mechanisms 78a, 78b are lowered creating an additional barrier between the ignited/ablated propellant target 30 and the adjacent propellant targets and reels 20, 22 (not shown) helping to maintain the structure of propellant tape 25 and to force the resulting hot gas into through nozzle 85 (not shown). Synchronizing mechanisms 78a, 78b are then retracted to allow propellant tape 25 to carry another propellant target 30 into ignition chamber 40. In the embodiment shown, synchronizing mechanisms 78a, 78b are lowered and retracted using a spring; however, in other embodiment another mechanism, such as movable pistons, may be used.

In the embodiment shown, tape containment walls 74a, 74b are fixed and target containment walls 42a, 42b are movable and are synchronized to lift away from propellant tape 25 prior to propellant tape 25 moving, allowing a new propellant target 30 to be brought into ignition chamber 40. Propellant tape 25 also carries away all post-ignition/ablation contaminants preventing them from clouding laser window 35.

Figure 7:
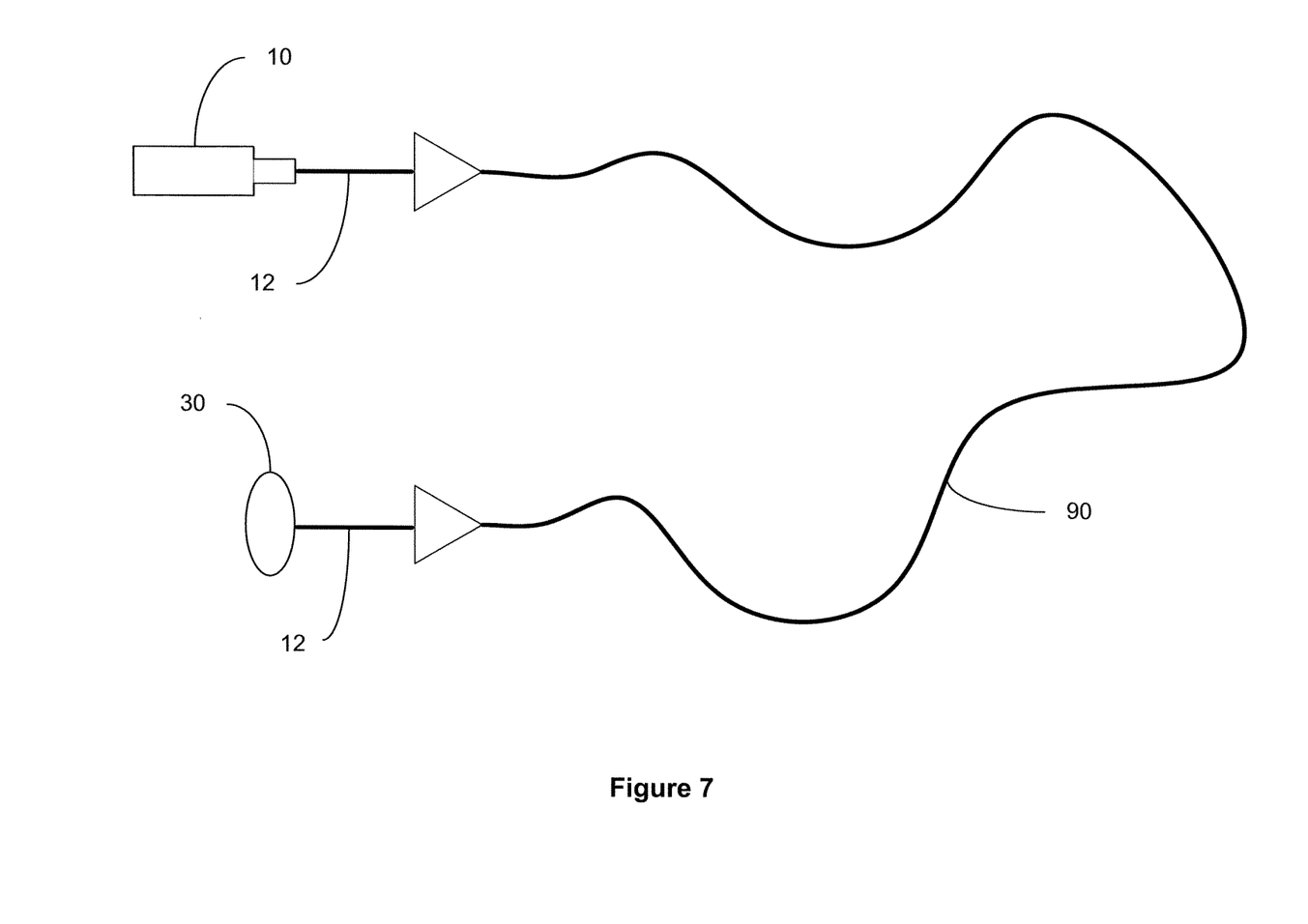
FIG. 7 illustrates an exemplary embodiment of a fiber optic transmission of a laser pulse of a laser ignition/ablation propulsion system.

FIG. 7 illustrates an exemplary embodiment of fiber optic transmission of laser pulse 12. In the embodiment shown, laser 10 is not located in the proximity of propellant target 30 and fiber optic cable 90 is used to transmit laser pulse 12 from laser 10 to propellant target 30.

Fiber optic cable 90 is capable of carrying a sufficiently intense laser pulse to achieve ignition/ablation, enabling many packaging options for laser 10. Utilizing fiber optics enables the use of remote lasers from either the ground, space, internal to the ignition/ablation propulsion system 100, or from anywhere with a suitable environment to power the thruster.

Figure 8:
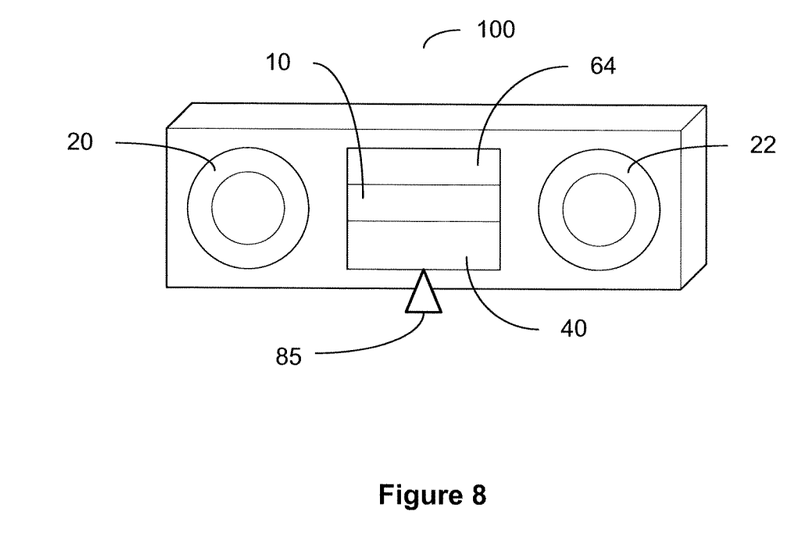
FIG. 8 illustrates an exemplary embodiment of a packaging option for an ignition/ablation propulsion system.

FIG. 8 illustrates a second exemplary embodiment of a packaging option for ignition/ablation propulsion system 100 showing controller 64, laser 10, ignition chamber 40, storage feed reel 20, storage takeup reel 22, and nozzle 85. The direction in which nozzle 85 points determines the direction of thrust. Nozzle 85 is controlled by controller 64.

In the embodiment shown, ignition/ablation propulsion system 100 has one nozzle; however, in other embodiments, ignition/ablation propulsion system 100 may include more than one nozzle pointed in the same or in varying directions.

The packaging option for ignition/ablation propulsion system 100 shown in FIG. 8 enables convenient packing into thruster modules with relatively long storage life. In addition, modular packaging allows for replenishment of attitude control propulsion subsystems (e.g., for a return mission). If scaled up, these modules could be used to push a potentially hazardous asteroid, meteoroid, or comet away avoiding a potential impact with Earth.

Figure 9A:
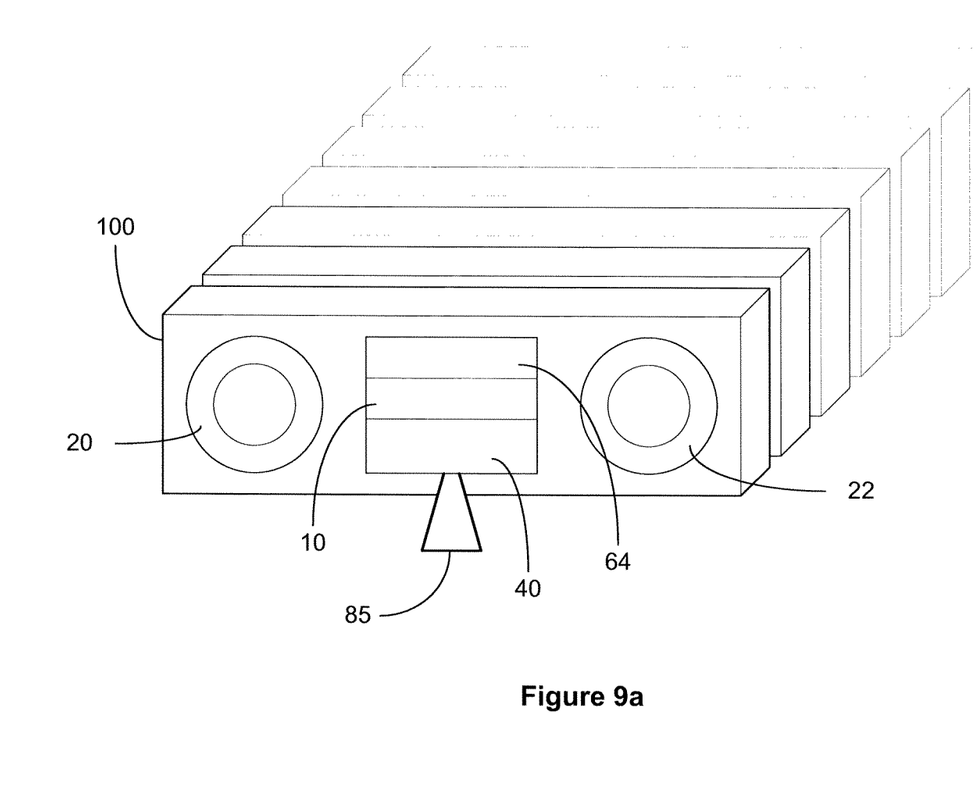
FIG. 9a illustrates an exemplary embodiment of a configuration of a plurality of packaged ignition/ablation propulsion systems.

FIG. 9a illustrates an exemplary embodiment of a configuration of a plurality of packaged ignition/ablation propulsion systems 100. In the embodiment shown, ignition/ablation propulsion systems 100 are stacked to achieve greater performance.

Figure 9B:
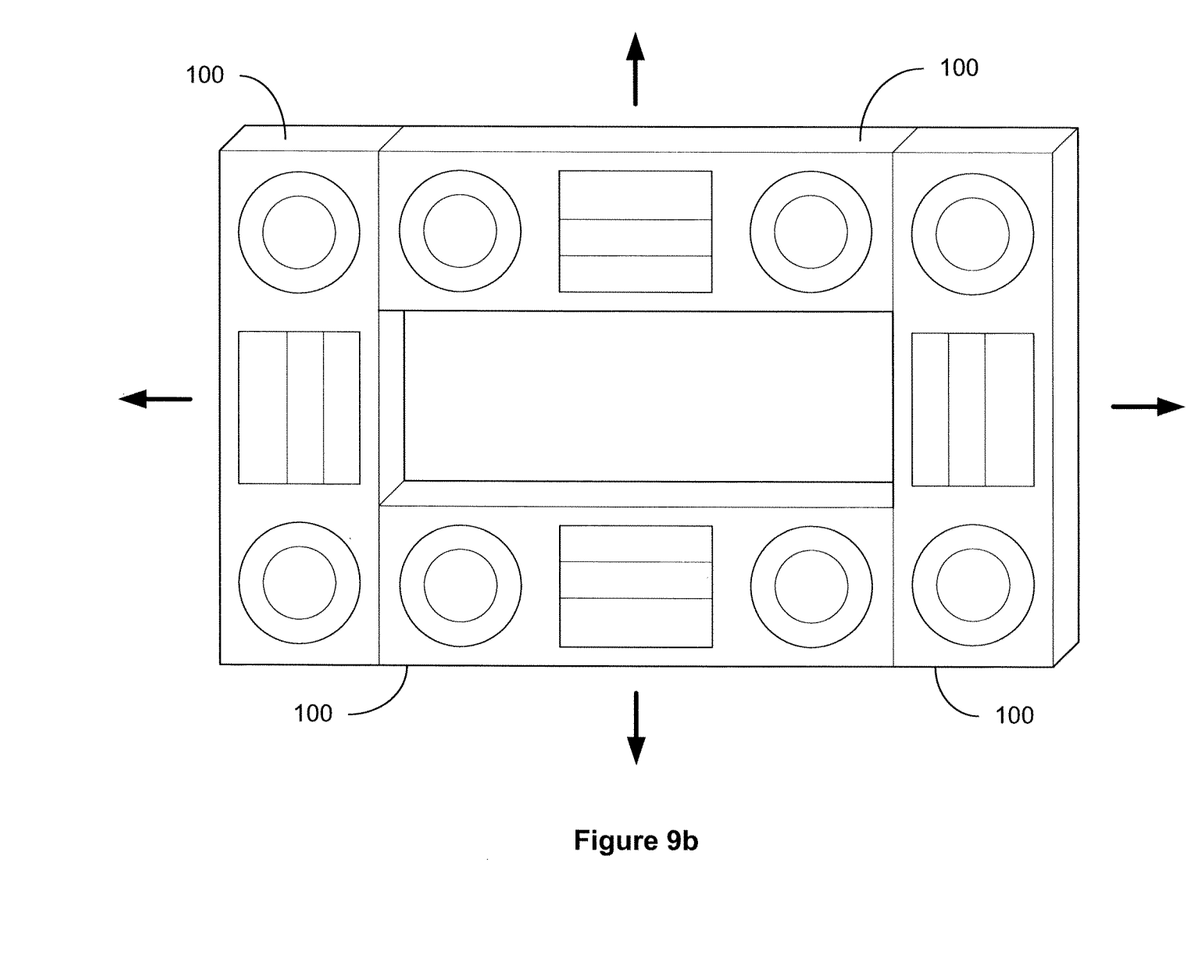
FIG. 9b illustrates a second exemplary embodiment of a configuration of a plurality of packaged ignition/ablation propulsion systems.

FIG. 9b illustrates a second exemplary embodiment of a configuration of a plurality of packaged ignition/ablation propulsion systems 100 combined to thrust in several directions. In another embodiment, a movable mirror may be used to ignite/ablate all modules using a single laser pulse.

Figure 10:
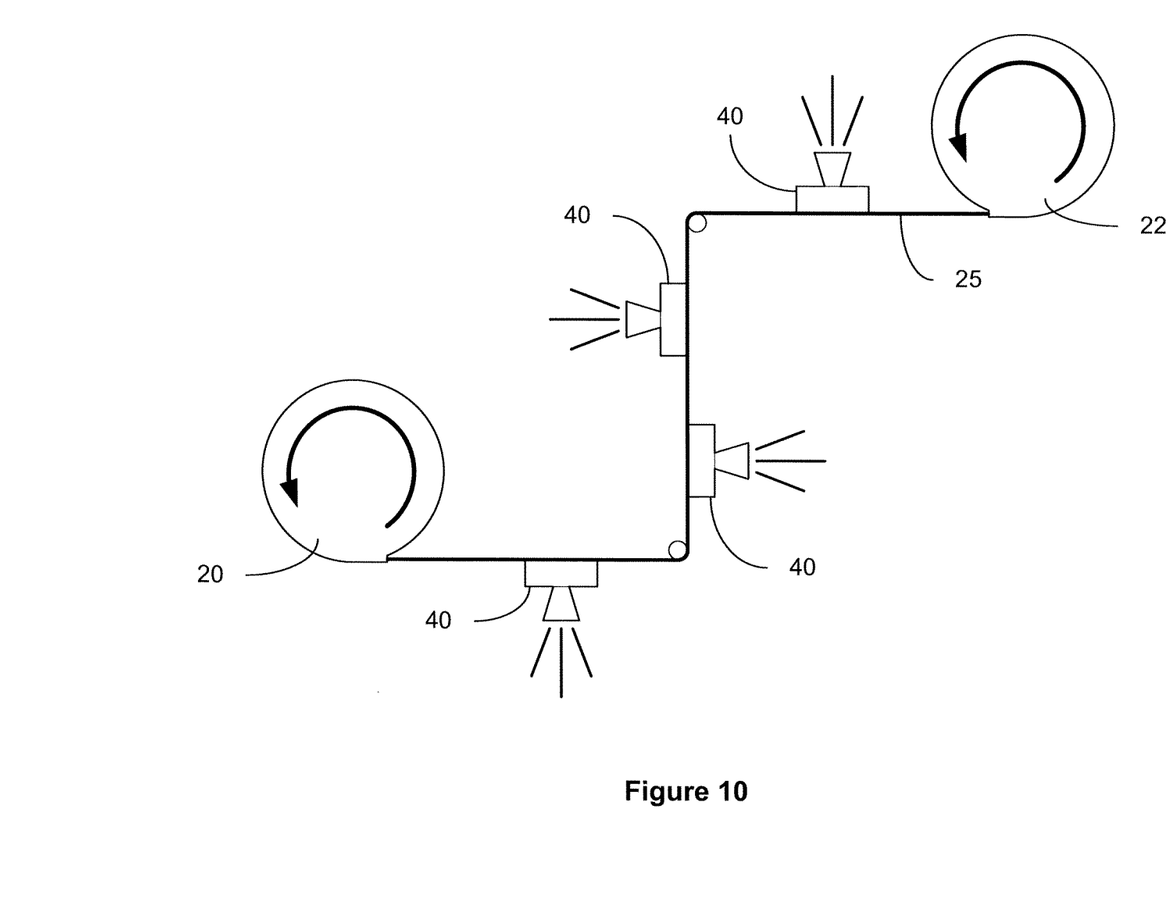
FIG. 10 illustrates an exemplary embodiment of an ignition/ablation propulsion system having multiple ignition chambers.

FIG. 10 illustrates an exemplary embodiment of an ignition/ablation propulsion system having multiple ignition chambers 40 positioned along a single propellant tape 25. In various embodiments, multiple ignition chambers 40 may share one or more pairs of storage feed and storage takeup reels, one laser, and one controller.

What is claimed is:

1. A propellant transport structure apparatus for a spacecraft comprised of:
   a transport layer having an elongated shape and a plurality of openings;
   a substantially transparent back cover, corresponding in size to said transport layer;
   a plurality of containment border structures sandwiched between said transport layer and said substantially transparent back cover; and
   a membrane affixed to a front side of said transport layer such that said membrane overlays said plurality of openings of said transport layer,
   wherein each of said plurality of openings is surrounded by one of said plurality of containment border structures,
   wherein each of said plurality of openings further includes a propellant material, said propellant material being affixed to said substantially transparent back cover and contained by one of said plurality of containment border structures,
   wherein one of said plurality of containment border structures encloses said propellant material along a length and a width of said transport layer,
   wherein each containment border structure is separated by a discrete distance from any other containment border structure,
   wherein said containment border structure is affixed to a back side of said transport layer and to a front side of said substantially transparent back cover,
   wherein said membrane is sufficiently thin that an ignited propellant material bursts through said membrane to propel a spacecraft,
   wherein said membrane comprises a material which is not flammable.

2. The apparatus of claim 1 wherein said substantially transparent back cover is transparent to a laser beam.

3. The apparatus of claim 1 wherein said transport layer is comprised of a highly resilient material.

4. The apparatus of claim 1 wherein said transport layer is nonconductive.

5. The apparatus of claim 1 wherein said transport layer is reinforced with reinforcing members.

6. The apparatus of claim 5 wherein said reinforcing members are metallic.

7. The apparatus of claim 5 wherein said reinforcing members are non-metallic.

8. The apparatus of claim 5 wherein said reinforcing members are comprised of a material selected from a group consisting of aluminum, titanium, steel, stainless steel, Kevlar®, nylon, and synthetic fibers.

9. The apparatus of claim 1 wherein said membrane is a material selected from a group consisting of plastic film, polyimide film, plastic foil, aluminum foil, and tin foil.

10. The apparatus of claim 1 wherein said containment border structures are uniformly spaced.

11. The apparatus of claim 1 wherein said containment border structures are non-uniformly spaced.

12. The apparatus of claim 1 wherein spacing of said containment border structures is dependent on said propellant material, amount of said propellant material, amount of thrust required, and scale of system in which said apparatus is used.

13. The apparatus of claim 1 wherein said containment border structures are spaced so that said propellant material contained in said containment border structure is isolated from propellant material contained in adjacent containment border structures.

14. The apparatus of claim 1 wherein said propellant material is ablation material and is placed continuously along said transport layer.

15. A laser ignition/ablation propulsion system comprised of:
   a laser;
   a laser ignition/ablation chamber having a window, said window being transparent to a laser beam, and at least one containment wall seal;
   propellant material; and
   a transport structure for transporting said propellant material into said laser ignition/ablation chamber, said transport structure comprised of:
     a transport layer having an elongated shape and a plurality of openings;
     a substantially transparent back cover, corresponding in size to said transport layer;
     a plurality of containment border structures sandwiched between said transport layer and said substantially transparent back cover; and
     a membrane affixed to a front side of said transport layer such that said membrane overlays said plurality of openings of said transport layer,
     wherein each of said plurality of openings is surrounded by one of said plurality of containment border structures,
     wherein each of said plurality of openings further includes a propellant material, said propellant material being affixed to said substantially transparent back cover and contained by one of said plurality of containment border structures,
     wherein one of said plurality of containment border structures encloses said propellant material along a length and a width of said transport layer,
     wherein each containment border structure is separated by a discrete distance from any other containment border structure,
     wherein said containment border structure is affixed to a back side of said transport layer and to a front side of said substantially transparent back cover,
     wherein said membrane is sufficiently thin that an ignited propellant material bursts through said membrane to propel a spacecraft,
     wherein said membrane comprises a material which is not flammable.

16. The system of claim 15 wherein said transport structure is rigid.

17. The system of claim 15 wherein said transport structure is flexible.

18. The system of claim 15 wherein said transport structure is adapted for mounting on a reel.

19. The system of claim 15 wherein said window is comprised of a material selected from a group consisting of glass, thick glass, plastic, resin, quartz, silicon, and polycarbonate resin thermoplastic.

20. The system of claim 15 wherein said transport structure further includes optional filler material.

21. A laser ignition/ablation propulsion system comprised of:
- a laser;
- a laser ignition/ablation chamber having a window, said window being transparent to a laser beam, and at least one containment wall seal;
- a transport structure for transporting said propellant material into said laser ignition/ablation chamber comprised of:
  - a transport layer having an elongated shape and a plurality of openings;
  - a substantially transparent back cover, corresponding in size to said transport layer;
  - a plurality of containment border structures sandwiched between said transport layer and said substantially transparent back cover; and
  - a membrane affixed to a front side of said transport layer such that said membrane overlays said plurality of openings of said transport layer,
  - wherein each of said plurality of openings is surrounded by one of said plurality of containment border structures,
  - wherein each of said plurality of openings further includes a propellant material, said propellant material being affixed to said substantially transparent back cover and contained by one of said plurality of containment border structures,
  - wherein one of said plurality of containment border structures encloses said propellant material along a length and a width of said transport layer,
  - wherein each containment border structure is separated by a discrete distance from any other containment border structure,
  - wherein said containment border structure is affixed to a back side of said transport layer and to a front side of said substantially transparent back cover,
  - wherein said membrane is sufficiently thin that an ignited propellant material bursts through said membrane to propel a spacecraft,
  - wherein said membrane comprises a material which is not flammable;
- a feed reel; and
- a takeup reel.

22. The system of claim 21 wherein said feed reel and said takeup reel are comprised of a material selected from a group consisting of high strength plastic, polyimide, carbon composite, aluminum, beryllium, and combinations thereof.

23. The system of claim 21 wherein speed of said feed reel and said takeup reel is variable.

24. The system of claim 21 wherein speed of said feed reel and said takeup reel is synchronized to pulsing of said laser beam.

25. The system of claim 21 wherein said speed of said feed reel and said takeup reel is proportionate to burn rate of said propellant targets.

26. The system of claim 21 which further includes a controller.

27. The system of claim 21 wherein said ignition chamber further includes a plurality of containment walls.

* * * * *